J. M. JONES.
COTTON PLANTER.

No. 14,134.　　　　　　　　　　　PATENTED JAN. 22, 1856

UNITED STATES PATENT OFFICE.

JOHN M. JONES, OF PALMYRA, NEW YORK, ASSIGNOR TO NEWTON FOSTER.

IMPROVEMENT IN COTTON-SEED PLANTERS.

Specification forming part of Letters Patent No. 14,134, dated January 22, 1856.

*To all whom it may concern:*

Be it known that I, JOHN M. JONES, of Palmyra, in the county of Wayne, in the State of New York, have invented a new and useful Improvement in Machines for Planting Cotton-Seed; and I do hereby declare that the following is a full, clear, and exact description of the construction and operation of the same, reference being had to the accompanying drawings, and to the letters of reference marked thereon, making a part of this specification, in which—

Figure 1:
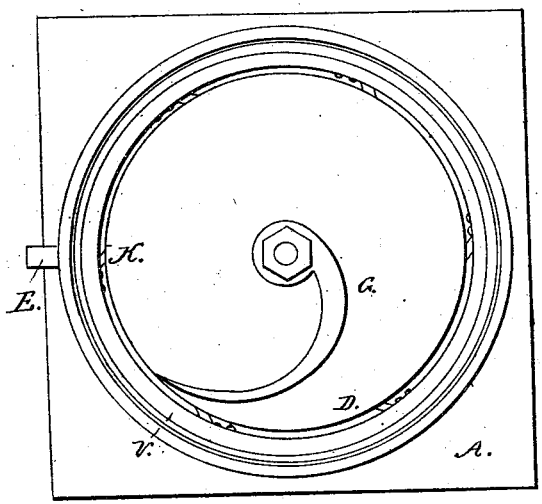
Figure 2:
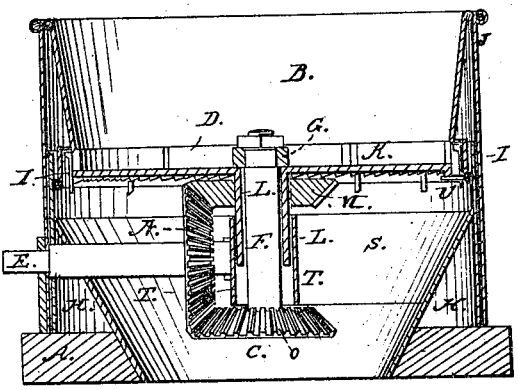
Figure 3:
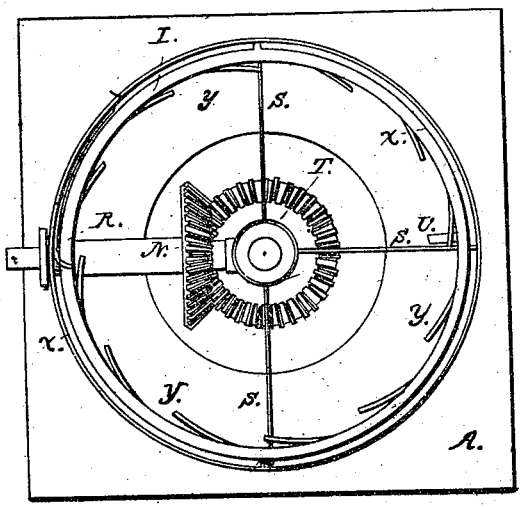
Figure 4:
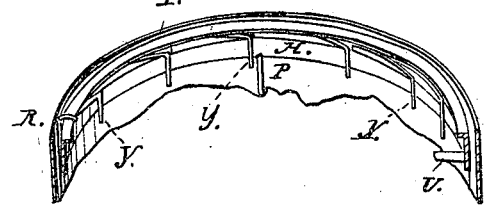

Figure 1 is a top view; Fig. 2, a vertical central section; Fig. 3, a top view underneath the hopper; Fig. 4, a perspective view of a detached portion.

The nature of my invention consists in an arrangement by which a thorough agitation, separation, and distribution of the seed are effected, and may be so connected with other parts of seed-planters now in use that the seed may be planted or drilled in with regularity and dispatch.

To enable others skilled in the art to make and use my invention, I will proceed to describe its construction and operation.

I construct a bed-plate of metal or wood, as shown at A, Figs. 1, 2, 3, having a cavity in the center large enough to admit the conductor C.

B, Fig. 2, is a seed box or hopper attached to a horizontal disk, D, which has a series of angular cavities in its outer rim or vertical projections, (see K, Figs. 1 and 2,) the periphery of the disk being deeply fluted, V, Fig. 1, and having a projection on the lower side of the rim in the form of a ratchet, W, Fig. 2. The disk D has a hollow vertical shaft, L, on which is a pinion, M, working into a gear-wheel, N, on shaft E, Fig. 2.

F is a shaft passing through the hollow shaft L, with a pinion, O, on its lower end working into the gear-wheel N, and having attached to its upper end the flexible arm G, Figs. 1 and 2.

H is a vertical cylinder extending above the conductor C, having on its inside two fulcrums, P, Fig. 4, and near the top a horizontal spring, R, Figs. 3 and 4, for purposes hereinafter described. On the inside of conductor C are three arms, S S S, Fig. 3, extending to a hollow socket, T, in the center, Figs. 2, 3, the shafts F and L revolving in the socket. The disk, seed-box, and gearing are supported thereby.

I is a circular rim, having a flange, X X, on its upper side, projecting inward near the hopper B, and having a series of flexible curved arms, y y y, Figs. 3 and 4, being twice the number that there are cavities in the disk D, having their ends bent at right angles in such a manner as to stand near the disk, and also having a fixed arm, U, on its inside, projecting under the disk and resting in the ratchet, Figs. 2, 3, 4. The rim I rests on the fulcrums on the inside of the cylinder H, Fig. 4. The spring R is angular, and rests on the top of the rim I, opposite the fixed arm U, holding the rim in its position and bringing the arm U against the ratchet, and when the machine is in motion causing a rapid vibratory motion of the rim.

J is an outside case passing around the whole machine.

In operating the machine I have the shaft E connected by a gear or other means to the driving-wheel of the drill, which, when moving, gives a rotary motion to the disk D and its hopper B, and also a reverse motion to the shaft F and its arm G. The seed being placed in the hopper, the flexible arm G forces them through the cavities in the disk D, the arms on the rim I taking them off as they pass through. The disk D and arm G having a reverse motion, the arm G passes each cavity twice every revolution; hence the necessity for double the number of arms on the rim I that there are cavities in the disk, which arms are so arranged with respect to the arm G that as soon as the said arm forces a seed through a cavity, where it would be liable to hold by its fiber, an arm on the rim I removes it, and the vibratory motion of the rim and its arms causes its immediate liberation. The seed, being liberated, fall into the conductor C, causing a continuous and even distribution of them.

The fluting on the periphery of the disk prevents the seed from sliding around between the arms and disk.

What I claim as my invention, and desire to secure by Letters Patent, is—

The disk D, constructed with exit-apertures K, cavities V, and ratchet W, and also the vibrating rim I, with flexible arms y thereon, the said disk being rotated upon said rim, in combination with and in opposite direction to the flexible arm G, in the manner and for the purpose set forth.

JOHN M. JONES.

Witnesses:
JOHN S. HOLLINGSHEAD,
WM. CAMMACK.